US007974487B2

(12) United States Patent
Yen

(10) Patent No.: US 7,974,487 B2
(45) Date of Patent: Jul. 5, 2011

(54) SYSTEM AND METHOD FOR IMAGE WHITE BALANCE ADJUSTMENT

(75) Inventor: Jonathan Yen, San Jose, CA (US)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 1113 days.

(21) Appl. No.: 11/787,970

(22) Filed: Apr. 17, 2007

(65) Prior Publication Data
US 2008/0259402 A1 Oct. 23, 2008

(51) Int. Cl.
*G06K 9/40* (2006.01)
*H04N 1/409* (2006.01)
*G06K 9/00* (2006.01)

(52) U.S. Cl. ........................ 382/254; 358/3.27
(58) Field of Classification Search .................. 382/162, 382/164, 166, 167, 172, 254, 266, 274, 275; 358/1.1, 1.13, 1.9, 3.27, 515, 516, 518; 348/207.11, 348/222.1, 223.1, 225.1, 230.1, 234, 362, 348/655, 671
See application file for complete search history.

(56) References Cited

U.S. PATENT DOCUMENTS

| | | | |
|---|---|---|---|
| 4,384,336 A | | 5/1983 | Frankle et al. |
| 4,506,290 A | * | 3/1985 | Hashimoto ................. 348/225.1 |
| 4,608,595 A | * | 8/1986 | Nakayama et al. ........... 348/655 |
| 4,626,893 A | * | 12/1986 | Yamanaka .................... 348/176 |
| 5,086,314 A | | 2/1992 | Aoki et al. |
| 5,146,323 A | * | 9/1992 | Kobori et al. ................. 358/527 |
| 5,170,247 A | * | 12/1992 | Takagi et al. ................. 348/655 |
| 5,175,615 A | * | 12/1992 | Ohara ........................ 348/223.1 |
| 5,185,658 A | | 2/1993 | Shinomiya |
| 5,541,649 A | * | 7/1996 | Yamamoto et al. ........ 348/223.1 |
| 5,543,836 A | * | 8/1996 | Hieda et al. ............... 348/223.1 |
| 5,648,818 A | | 7/1997 | Fukatsu |
| 5,659,357 A | | 8/1997 | Miyano |
| 5,953,058 A | * | 9/1999 | Hanagata .................... 348/223.1 |
| 5,995,142 A | * | 11/1999 | Matsufune ................. 348/223.1 |
| 6,529,235 B1 | * | 3/2003 | Tseng ........................ 348/223.1 |
| 6,621,519 B2 | * | 9/2003 | Nakayama et al. ........ 348/223.1 |

(Continued)

OTHER PUBLICATIONS

Finlayson, et al., Color by Correlation: A Simple, Unifying Framework for Color Constancy, IEEE Transactions on Pattern Analysis and Machine Intelligence, vol. 23, No. 11, Nov. 2001.

*Primary Examiner* — Amir Alavi
(74) *Attorney, Agent, or Firm* — SoCal IP Law Group LLP; Steven C. Sereboff; Jonathan Pearce

(57) ABSTRACT

The subject application is directed to a system and method for image enhancement. Image data, encoded as a plurality of pixels in YCbCr space, is first received, with Y representing a luma component, Cb representing a blue chroma component, and Cr representing a red chroma component. A maximum Y value is selected from the received image data. HSV image data is received corresponding to the YCbCr image data, with H representing a hue component, S representing a saturation component, and V representing a brightness component. A pixel is then selected from the HSV image data having a minimum S value. The S (saturation) value and the V (brightness) value of the selected pixel are then tested against a first and a second threshold level. Thereafter, a Max-RGB algorithm is selectively applied to the RGB image data in accordance with the output of the testing.

18 Claims, 9 Drawing Sheets
(5 of 9 Drawing Sheet(s) Filed in Color)

U.S. PATENT DOCUMENTS

| | | |
|---|---|---|
| 6,670,987 B1 | 12/2003 | Taura |
| 6,721,000 B1 | 4/2004 | Lin et al. |
| 6,727,942 B1 | 4/2004 | Miyano |
| 6,798,449 B2 | 9/2004 | Hsieh |
| 7,023,570 B2 | 4/2006 | Marsden et al. |
| 7,113,207 B2 | 9/2006 | Fukui et al. |
| 2002/0135787 A1 | 9/2002 | Smith et al. |
| 2003/0016306 A1 | 1/2003 | Ogata et al. |
| 2003/0156206 A1 | 8/2003 | Ikeda et al. |
| 2003/0174216 A1 | 9/2003 | Iguchi et al. |
| 2004/0090536 A1 | 5/2004 | Tsai et al. |
| 2004/0151370 A1 | 8/2004 | Sasaki |
| 2005/0007463 A1 | 1/2005 | Xia et al. |
| 2005/0012831 A1 | 1/2005 | Yano |
| 2005/0012832 A1 | 1/2005 | Yano |
| 2005/0013506 A1 | 1/2005 | Yano |
| 2005/0089239 A1 | 4/2005 | Brajovic |
| 2005/0122408 A1 | 6/2005 | Park et al. |
| 2005/0213128 A1 | 9/2005 | Imai et al. |
| 2005/0219379 A1 | 10/2005 | Shi |
| 2005/0219380 A1 | 10/2005 | Wu |
| 2006/0045377 A1 | 3/2006 | Kawai |
| 2006/0098254 A1 | 5/2006 | Tokuhashi |
| 2006/0153444 A1 | 7/2006 | Trimeche et al. |
| 2006/0164521 A1 | 7/2006 | Chikane et al. |
| 2008/0259402 A1* | 10/2008 | Yen ............ 358/3.27 |
| 2009/0067714 A1* | 3/2009 | Yen et al. ............ 382/172 |

* cited by examiner

| SmartImaging Images\Scene | Negated | Problematic | Positive |
|---|---|---|---|
| Composite | 27 | 0 | 2 |
| Man Made | 160 | 7 | 29 |
| Natural | 27 | 4 | 11 |
| Statistics | 214 | 11 | 42 |
| Percentage | 80.15% | 4.12% | 15.73% |

SYSTEM AND METHOD FOR IMAGE WHITE BALANCE ADJUSTMENT

BACKGROUND OF THE INVENTION

The subject application is directed to a system and method for image enhancement. More particularly, the subject application is directed to a system and method which uses automatic white balancing to allow for better rendering of images for printing or display after image capture.

Images inherit hue and brightness biases from a light source during image capturing process by an image capturing device, such as a digital camera. Typically, there is an image processing step, known as automatic white balancing, in such image capturing devices to remove or reduce such hue and brightness biases. Automatic white balancing for image capturing adjusts the hue and brightness according to illuminant estimation. Illuminant estimation is the process of determining if the light source is fluorescent, tungsten, incandescent, or day light and can be quite computationally intensive. The hue or brightness biases introduced by the source light are then removed or reduced, typically using the Max-RGB algorithm. In such process, it is assumed that the brightest point in the image should reflect the hue and brightness of the light source. The process involves selecting a white reference point in the image and determining its hue and brightness biases. The entire image is then adjusted to counter the biases such that the white reference point will be fully bright and neutral in color.

SUMMARY OF THE INVENTION

In accordance with one embodiment of the subject application, there is provided a system and method for image enhancement which occurs for image data that has already been acquired.

Further, in accordance with one embodiment of the subject application, there is provided a system and method which uses automatic white balancing to allow for better rendering of images for printing or display after image capture.

Still further, in accordance with one embodiment of the subject application, there is provided a system and method for image enhancement which is automatic and which does not require illuminant estimation.

Still further, in accordance with one embodiment of the subject application, there is provided a system and method for image enhancement which determines whether it is appropriate to adjust the hue or brightness of the image using the Max-RGB algorithm.

Still further, in accordance with one embodiment of the subject application, there is provided an image enhancement system. The system comprises means adapted for receiving YCbCr image data encoded as a plurality of pixels in YCbCr space, wherein Y is a luma component, Cb is a blue chroma component, and Cr is a red chroma component, and means adapted for selecting a maximum Y value from the image data. The system also comprises means adapted for receiving HSV image data corresponding to the YCbCr image data, wherein H is a hue component, S is a saturation component, and V is a brightness component, and means adapted for selecting a pixel from HSV image data having a minimum S value. The system further comprises testing means adapted for testing an S value and a V value of a selected pixel against first and second threshold levels and adjustment means adapted for selectively applying a Max-RGB algorithm to the RGB image data in accordance with an output of the testing means.

In one embodiment of the subject application, the system further comprises means adapted for bypassing the adjustment means when at least one of the S values of the selected pixel is zero and the V value of the selected pixel is one.

In another embodiment of the subject application, the system also comprises means adapted for applying a tone reproduction operation on RGB image data.

In yet another embodiment of the subject application, the system further comprises means adapted for receiving RGB image data, means adapted for converting received RGB image data into the YCbCr image data, and means adapted for converting received RGB image data into the HSV image data.

In another embodiment of the subject application, the testing means includes means adapted for outputting a signal representative of at least one of a positive adjustment, a negated adjustment and a problematic condition relative to adjustment.

Still further, in accordance with one embodiment of the subject application, there is provided a method for image enhancement in accordance with the system as set forth above.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The subject application is described with reference to certain figures, including.

DETAILED DESCRIPTION OF THE PREFERRED EMBODIMENT

The subject application is directed to a system and method for image enhancement which occurs for image data that has already been acquired. In particular, the subject application is directed to a system and method which uses automatic white balancing to allow for better rendering of images for printing or display after image capture. More particularly, the subject application is directed to a system and method for image enhancement which is automatic and which does not require illuminant estimation. In accordance with one embodiment of the subject application, the system and method for image enhancement determines whether it is appropriate to adjust the hue or brightness of the image using the Max-RGB algorithm. It will become apparent to those skilled in the art that the system and method described herein are suitably adapted to a plurality of varying electronic fields employing electronic imaging, including, for example and without limitation, communications, general computing, data processing, document processing, or the like. The preferred embodiment, as depicted in FIG. 1, illustrates a document processing field for example purposes only and is not a limitation of the subject application solely to such a field.

Figure 1:
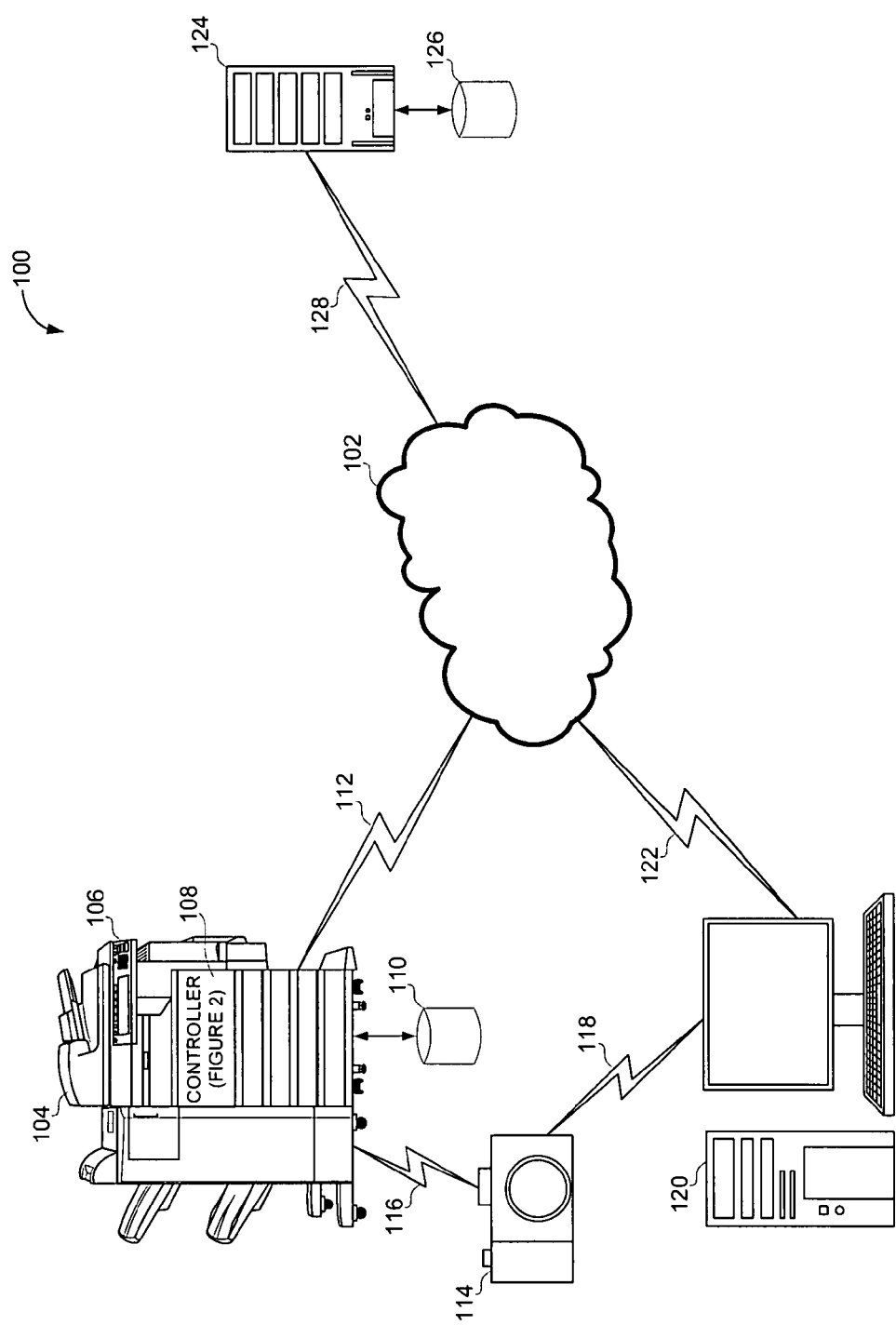
FIG. 1 is an overall diagram of the image enhancement system according to one embodiment of the subject application.

Referring now to FIG. 1, there is shown an overall diagram of the system 100 for image enhancement in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or the any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also includes a document processing device 104, depicted in FIG. 1 as a multifunction peripheral device, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document processing devices include, for example and without limitation, the Toshiba e-Studio Series Controller. In accordance with one aspect of the subject application, the document processing device 104 is suitably adapted to provide remote document processing services to external or network devices. Preferably, the document processing device 104 includes hardware, software, and any suitable combination thereof, configured to interact with an associated user, a networked device, or the like.

According to one embodiment of the subject application, the document processing device 104 is suitably equipped to receive a plurality of portable storage media, including, without limitation, Firewire drive, USB drive, SD, MMC, XD, Compact Flash, Memory Stick, and the like. In the preferred embodiment of the subject application, the document processing device 104 further includes an associated user interface 106, such as a touch-screen, LCD display, touch-panel, alpha-numeric keypad, or the like, via which an associated user is able to interact directly with the document processing device 104. In accordance with the preferred embodiment of the subject application, the user interface 106 is advantageously used to communicate information to the associated user and receive selections from the associated user. The skilled artisan will appreciate that the user interface 106 comprises various components, suitably adapted to present data to the associated user, as are known in the art. In accordance with one embodiment of the subject application, the user interface 106 comprises a display, suitably adapted to display one or more graphical elements, text data, images, or the like, to an associated user, receive input from the associated user, and communicate the same to a backend component, such as a controller 108, as explained in greater detail below. Preferably, the document processing device 104 is communicatively coupled to the computer network 102 via a suitable communications link 112. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art.

In accordance with the subject application, the document processing device 104 further incorporates a backend component, designated as the controller 108, suitably adapted to facilitate the operations of the document processing device 104, as will be understood by those skilled in the art. Preferably, the controller 108 is embodied as hardware, software, or any suitable combination thereof, configured to control the operations of the associated document processing device 104, facilitate the display of images via the user interface 106, direct the manipulation of electronic image data, and the like. For purposes of explanation, the controller 108 is used to refer to any myriad of components associated with the document processing device 104, including hardware, software, or combinations thereof, functioning to perform, cause to be performed, control, or otherwise direct the methodologies described hereinafter. It will be understood by those skilled in the art that the methodologies described with respect to the controller 108 are capable of being performed by any general purpose computing system, known in the art, and thus the controller 108 is representative of such a general computing device and is intended as such when used hereinafter. Furthermore, the use of the controller 108 hereinafter is for the example embodiment only, and other embodiments, which will be apparent to one skilled in the art, are capable of employing the system and method for image enhancement in accordance with one embodiment of the subject application. The functioning of the controller 108 will better be understood in conjunction with the block diagrams illustrated in FIGS. 2 and 3, explained in greater detail below.

Communicatively coupled to the document processing device 104 is a data storage device 110. In accordance with the preferred embodiment of the subject application, the data storage device 110 is any mass storage device known in the art including, for example and without limitation, magnetic storage drives, a hard disk drive, optical storage devices, flash memory devices, or any suitable combination thereof. In the preferred embodiment, the data storage device 110 is suitably adapted to store document data, image data, electronic database data, or the like. It will be appreciated by those skilled in the art that while illustrated in FIG. 1 as being a separate component of the system 100, the data storage device 110 is capable of being implemented as internal storage component of the document processing device 104, a component of the controller 108, or the like, such as, for example and without limitation, an internal hard disk drive, or the like. In accordance with one embodiment of the subject application, the data storage device 110 includes data representative of images, such as photographic data, computer generated images, electronic documents, threshold values corresponding to saturation and brightness, statistical data, tonal reproductive curves, and the like.

Illustrated in FIG. 1 is an image capture device, represented as a camera 114, suitably adapted to generate electronic image data. Any suitable photographic device known in the art, is capable of capturing image data for processing in accordance with one embodiment of the subject application. As shown in FIG. 1, the camera 114 is capable of transmitting image data to the document processing device 104 via a suitable communications link 116. As will be appreciated by those skilled in the art, suitable communications links include, for example and without limitation, 802.11a, 802.11b, 802.11g, 802.11(x), Bluetooth, a proprietary communications network, WiMax, infrared, optical, the public switched telephone network, or any suitable wireless data transmission system, or wired communications known in the art. The skilled artisan will further appreciated that in accordance with one particular embodiment of the subject application, the camera 114 includes suitable portable digital media, which is capable of being received by the document processing device 104, containing electronic image data thereon. Suitable portable digital media includes, for example and without limitation, compact flash, xD, SD, memory stick, or other flash random access memory, optical data storage devices, magnetic data storage, or the like. Furthermore, the skilled artisan will also appreciate that the camera 114 is capable of being a general film camera, whereon the communications link 116 is representative of providing a hardcopy of an image to the document processing device 104, which scans the image to generate the image data used in accordance with the subject methodologies described hereinafter.

The system 100 illustrated in FIG. 1 further depicts a user device 120, in data communication with the computer network 102 via a communications link 122. It will be appreciated by those skilled in the art that the user device 120 is shown in FIG. 1 as a personal computer for illustration purposes only. As will be understood by those skilled in the art, the user device 120 is representative of any personal computing device known in the art, including, for example and without limitation, a computer workstation, a personal computer, a personal data assistant, a web-enabled cellular telephone, a smart phone, a proprietary network device, or other web-enabled electronic device. The communications link 122 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. Preferably, the user device 120 is suitably adapted to generate and transmit image data, electronic documents, document processing instructions, user interface modifications, upgrades, updates, personalization data, or the like, to the document processing device 104, or any other similar device coupled to the computer network 102.

The skilled artisan will appreciate that the camera 114 is also capable of communicating image data to a suitable user device 120 via the communications link 118, whereupon the user device communicates the image data to the document processing device 104 for further processing. As will be understood by those skilled in the art, the communications link 118 is any suitable communications channel known in the art including, for example and without limitation, wired, e.g., USB or FireWire port, portable storage media, e.g., xD, SD, Compact Flash, memory stick, or other flash memory, or wireless, e.g., Bluetooth, infrared, optical, proprietary wireless communications, 802.11a, 802.11b, 802.11g, 802.11(x), or the like.

The system 100 further illustrates a network storage server 124 coupled to a data storage device 126. Preferably, the network storage server 124 is representative of any network storage device known in the art capable of storing document data, image data, video data, sound data, multimedia data, or other suitable electronic data, as will be known in the art. In accordance with one embodiment of the subject application, the data storage device 126 includes a plurality of electronic data, including image data, document data, or the like. The network storage server 124 is communicatively coupled to the computer network 102 via a suitable communications link 128. As will be understood by those skilled in the art, the communications link 128 includes, for example and without limitation a proprietary communications network, infrared, optical, Bluetooth, WiMax, 802.11a, 802.11b, 802.11g, 802.11(x), the public switched telephone network, or any suitable wireless data transmission system, or wired communications known in the art.

Figure 2:
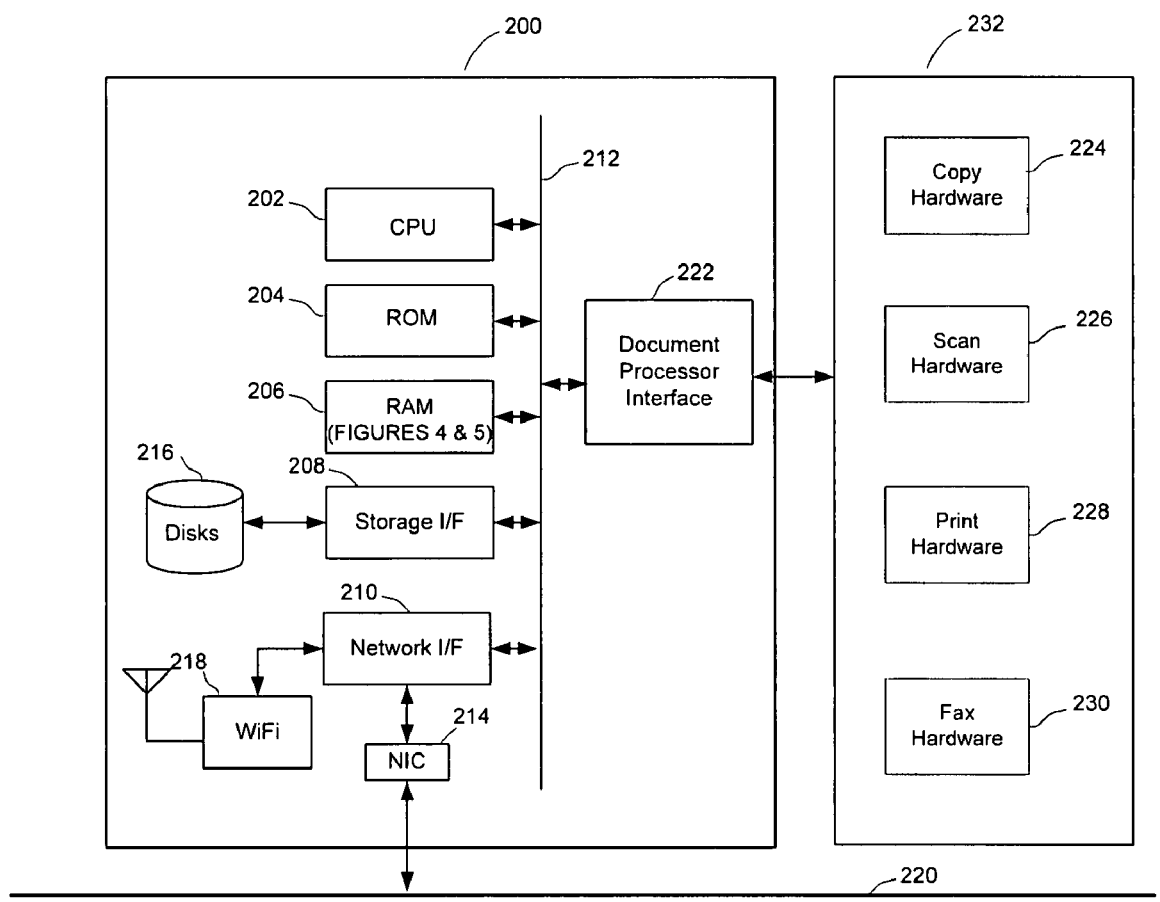
FIG. 2 is a block diagram illustrating controller hardware for use in image enhancement system according to one embodiment of the subject application.

Turning now to FIG. 2, illustrated is a representative architecture of a suitable backend component, i.e., the controller 200, shown in FIG. 1 as the controller 108, on which operations of the subject system 100 are completed. The skilled artisan will understand that the controller 108 is representative of any general computing device, known in the art, capable of facilitating the methodologies described herein. Included is a processor 202, suitably comprised of a central processor unit. However, it will be appreciated that processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the controller 200.

Also included in the controller 200 is random access memory 206, suitably formed of dynamic random access memory, static random access memory, or any other suitable, addressable and writable memory system. Random access memory provides a storage area for data instructions associated with applications and data handling accomplished by processor 202.

A storage interface 208 suitably provides a mechanism for non-volatile, bulk or long term storage of data associated with the controller 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the controller 200 to communicate to other devices. The network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 214 is interconnected for data interchange via a physical network 220, suitably comprised of a local area network, wide area network, or a combination thereof.

Data communication between the processor 202, read only memory 204, random access memory 206, storage interface 208 and the network interface subsystem 210 is suitably accomplished via a bus data transfer mechanism, such as illustrated by bus 212.

Also in data communication with bus the 212 is a document processor interface 222. The document processor interface 222 suitably provides connection with hardware 232 to perform one or more document processing operations. Such operations include copying accomplished via copy hardware 224, scanning accomplished via scan hardware 226, printing accomplished via print hardware 228, and facsimile communication accomplished via facsimile hardware 230. It is to be appreciated that a controller suitably operates any or all of the aforementioned document processing operations. Systems accomplishing more than one document processing operation are commonly referred to as multifunction peripherals or multifunction devices.

Figure 3:
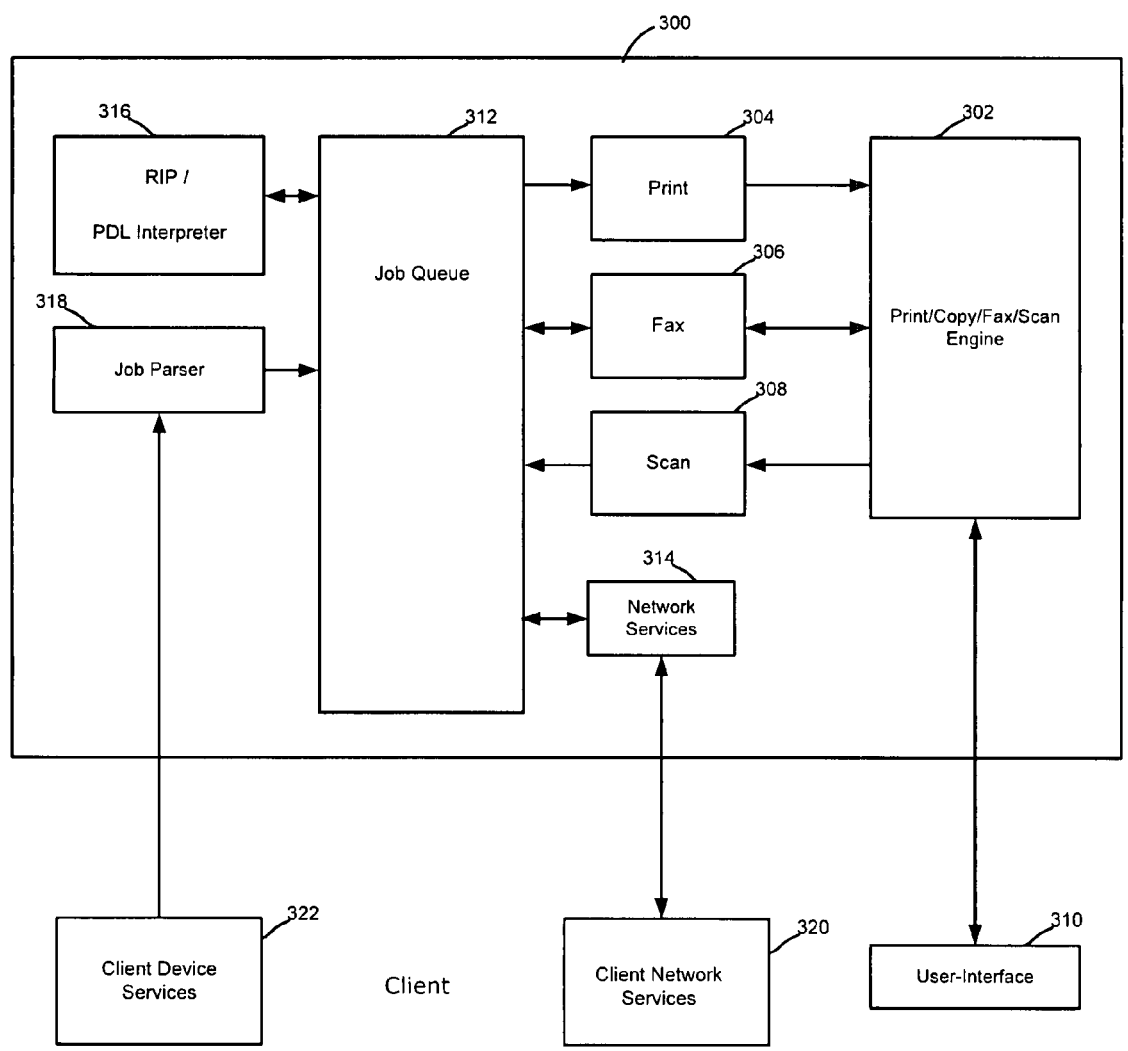
FIG. 3 is a functional diagram illustrating the controller for use in the image enhancement system according to one embodiment of the subject application.

Functionality of the subject system 100 is accomplished on a suitable document processing device, such as the document processing devices 104 and 110, which include the controller 200 of FIG. 2, (shown in FIG. 1 as the controller 108 and the controller 114, respectively) as an intelligent subsystem associated with a document processing device. In the illustration of FIG. 3, controller function 300 in the preferred embodiment, includes a document processing engine 302. A suitable controller functionality is that incorporated into the Toshiba e-Studio system in the preferred embodiment. FIG. 3 illustrates suitable functionality of the hardware of FIG. 2 in connection with software and operating system functionality as will be appreciated by one of ordinary skill in the art.

In the preferred embodiment, the engine 302 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that are subset of the document processing operations listed above.

The engine 302 is suitably interfaced to a user interface panel 310, which panel allows for a user or administrator to access functionality controlled by the engine 302. Access is suitably enabled via an interface local to the controller, or remotely via a remote thin or thick client.

The engine 302 is in data communication with the print function 304, facsimile function 306, and scan function 308. These functions facilitate the actual operation of printing, facsimile transmission and reception, and document scanning for use in securing document images for copying or generating electronic versions.

A job queue 312 is suitably in data communication with the print function 304, facsimile function 306, and scan function 308. It will be appreciated that various image forms, such as bit map, page description language or vector format, and the like, are suitably relayed from the scan function 308 for subsequent handling via the job queue 312.

The job queue 312 is also in data communication with network services 314. In a preferred embodiment, job control, status data, or electronic document data is exchanged between the job queue 312 and the network services 314. Thus, suitable interface is provided for network based access to the controller 300 via client side network services 320, which is any suitable thin or thick client. In the preferred embodiment, the web services access is suitably accomplished via a hypertext transfer protocol, file transfer protocol, uniform data diagram protocol, or any other suitable exchange mechanism. The network services 314 also advantageously supplies data interchange with client side services 320 for communication via FTP, electronic mail, TELNET, or the like. Thus, the controller function 300 facilitates output or receipt of electronic document and user information via various network access mechanisms.

The job queue 312 is also advantageously placed in data communication with an image processor 316. The image processor 316 is suitably a raster image process, page description language interpreter or any suitable mechanism for interchange of an electronic document to a format better suited for interchange with device functions such as print 304, facsimile 306 or scan 308.

Finally, the job queue 312 is in data communication with a parser 318, which parser suitably functions to receive print job language files from an external device, such as client device services 322. The client device services 322 suitably include printing, facsimile transmission, or other suitable input of an electronic document for which handling by the controller function 300 is advantageous. The Parser 318 functions to interpret a received electronic document file and relay it to the job queue 312 for handling in connection with the afore-described functionality and components.

In accordance with one example embodiment of the subject application, RGB image data is received by the document processing device 104 via any suitable means. As will be appreciated by those skilled in the art, suitable means include, for example and without limitation, electronic image data received via the computer network 102 from the user device 120, the network storage server 124, the camera 114, or other personal electronic device coupled to the computer network 102; directly via the communications link 116 with the digital camera 114; via a scanning operation performed on a physical image by the document processing device 104; via receipt of a portable storage medium by the document processing device 104; via retrieval from the data storage device 110; or the like. The controller 108 or other suitable component associated with the document processing device 104 then converts the received RGB image data into YCbCr image data. A maximum Y value is then selected by the controller 108 or other suitable component of the document processing device 104 from the YCbCr image data. Preferably, the maximum luminance value (Ymax) is calculated in the Y plane of the YCbCr color space corresponding to the received image data. It will be appreciated by those skilled in the art that other methods of selecting a maximum luminance value are capable of being employed in accordance with the subject application. For example and without limitation, the received RGB image data is capable of being converted into CIE L*a*b* image data, whereupon the maximum luminance value (Lmax) is selected by the controller 108 or other suitable component of the document processing device 104 from the CIE L*a*b* image data.

The received image data is then converted from RGB color space to HSV color space, wherein H represents hue, S represents saturation, and V represents brightness. A pixel is then selected from the HSV image data having a minimum chrominance value, i.e., the minimum S (saturation) value, in HSV color space. The skilled artisan will appreciate that the pixel is selected from among those pixels having Ymax as its Y value in YCbCr color space. Therefore, as will be understood by those skilled in the art, the pixel in HSV having the minimum S value and corresponding to one of the pixels in YCbCr color space having a Y value of Ymax will be selected. It will be understood by those skilled in the art that the use of HSV color space is for example purposes only, and the subject application is capable of employing other color space models to ascertain the minimum chrominance value of those pixels having the highest luminance value (Ymax). Thus, for example and without limitation, the received RGB image is capable of being converted to HSL color space, wherein H represents hue, S represents saturation, and L represents luminosity. Thereafter, in accordance with the subject application, a pixel having a minimum chrominance value (Smin) is selected by the controller 108 or other suitable component of the document processing device 104 from among those pixels having the highest luminance value (Ymax). The skilled artisan will appreciate that the selected pixel is representative of a white reference point, as is used in the art. Stated another way, the selected pixel is representative of a pixel having the highest luminance, while also having the most neutral color, i.e., the lowest chrominance value. Those skilled in the art will appreciate that the use of YCbCr, CIE L*a*b*, HSV, and HSL color space models are for example purposes only, and other methods for ascertaining the maximum luminance (Ymax) values and minimum chrominance (Smin) values for pixels are capable of implementation in accordance with the subject application.

A determination is then made following this selection whether a tone reproduction operation is required to be applied to the RGB image data. That is, a determination is made whether the selected white reference point has a maximum R value, maximum G value and maximum B value (MaxR, MaxG, MaxB values) as its RGB color space values. When such a determination is positive, a tone reproduction curve (illustrated in FIG. 6) is applied to all pixels of the input image to improve the hue and brightness of the image.

Once the tone reproduction curve has been applied, or in the event that no tone reproduction operation is required, the controller 108 or other suitable component of the document processing device 104 then determines whether the S value is equivalent to 0 and the V value is equivalent to 1. It will be understood by those skilled in the art that when the values of this pixel are equivalent to S=0 and V=1, then no Max-RGB algorithm is required, i.e., no adjustment is necessary. Upon such a determination, an output adjustment signal is sent out corresponding to a negated adjustment, e.g., a notification is attached to the image indicating that no hue and brightness (or luminosity) adjustment is required. The enhanced image, or in this case unenhanced image, is then output by the document processing device 104 in accordance with a user selected operation.

When the value of S and V are not equivalent to 0 and 1, respectively, the controller 108 or other suitable component of the document processing device 104 then tests the S value and the V value against a first threshold value and a second threshold value, respectively. In accordance with one embodiment of the subject application, the threshold values are determined by a statistical analysis. For example, a suitable statistical analysis is capable of being generated using a spreadsheet to record image file names, coordinates of reference points, the reference point's HSV values, and a marker indicating whether the Max-RGB is required for hue or brightness improvement. It will be appreciated by those skilled in the art that such a statistical analysis indicates that a majority of input images do not require hue or brightness improvement, a small percentage do require hue or brightness improvement, and an even smaller percentage fall within a "problematic" range. Suitable examples of the application of the subject application are discussed in greater detail below with respect to FIGS. 5-14.

Returning to operations of the current example embodiment, the controller 108 or suitable component of the document processing device 104 first determines whether the S value is less than the first threshold value and whether the V value is greater than the second threshold value. When the preceding statements are not true, an output adjust condition signal is generated indicating that a "problematic" condition has occurred. It will be appreciated by those skilled in the art that a problematic condition arises when the application of the Max-RGB gives rise to an unacceptable result, e.g., a sunset scene (shown in FIG. 11) appears after application as a dawn scene (shown in FIG. 12). Thus, in accordance with one embodiment of the subject application, when a problematic condition is detected, the Max-RGB algorithm is not applied to the image data.

When it is determined that the S value is less than the first threshold value and the V value is greater than the second threshold value, the Max-RGB algorithm is applied to the RGB image data. In accordance with a further embodiment of the subject application, the values of S and V are used to satisfy a general constraint, e.g., F(S,V), where F is representative of a linear or quadratic equation, such that the result of the constraint indicates whether or not to apply the Max-RGB algorithm to the received image data. A suitable linear constraint includes, for example and without limitation, $a*S+b*V<c$, wherein a, b, and c are constant coefficients for the linear constraint. The skilled artisan will appreciate that other linear constraints, or quadratic constraints are capable of being employed in accordance with the subject application to facilitate in the determination of whether or not to apply the Max-RGB algorithm to received image data. The skilled artisan will appreciate that such an application results in an adjustment to the hue and brightness of the input image. Thereafter, the enhanced image is output by the document processing device 104 in accordance with a desired document processing operation.

Figure 4:
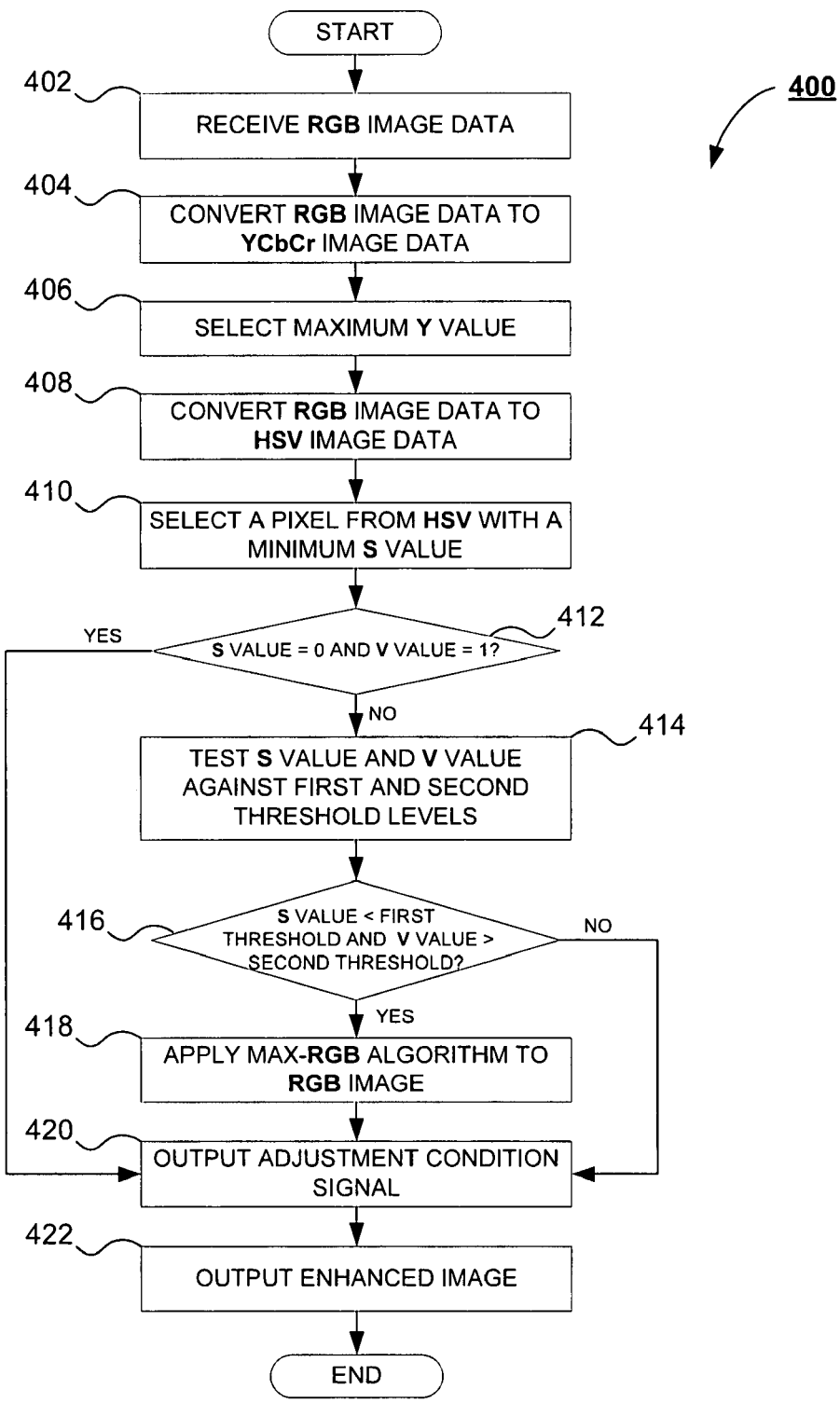
FIG. 4 is a flowchart illustrating a method for image enhancement according to one embodiment of the subject application.

The skilled artisan will appreciate that the subject system 100 and components described above with respect to FIG. 1, FIG. 2, and FIG. 3 will be better understood in conjunction with the methodologies described hereinafter with respect to FIG. 4. Turning now to FIG. 4, there is shown a flowchart 400 illustrating a method for image enhancement in accordance with one embodiment of the subject application. The method begins at step 402 with the receipt of an input image in RGB color space, i.e., RGB image data. The received RGB image data is then converted, at step 404, into YCbCr image data via any suitable means known in the art. A maximum Y value of the YCbCr image data is then selected at step 406. It will be appreciated by those skilled in the art that the conversion to YCbCr color space is for example purposes only, and the subject application is capable of using a conversion to another luminance-chrominance color space, for example and without limitation, CIE L*a*b*, to ascertain the desired maximum Y value in accordance with the method described herein. The received RGB image data is converted, at step 408, to HSV image data. A pixel from the HSV image data is then selected at step 410 corresponding to a pixel having a minimum S value, e.g., lowest chrominance value. The skilled artisan will appreciate that conversion of the image data to a different color space model, for example and without limitation, HSL color space, is also capable of being used in accordance with the subject application to ascertain a minimum S value.

At step 412, the S value and the V value of the selected pixel are analyzed to determine whether the value of S is equivalent to 0 and the value of V is equivalent to 1. It will be understood by those skilled in the art that such values indicate that the Max-RGB algorithm is not to be applied to the input image, and flow progresses from step 412 to step 420, which will be discussed in further detail below.

A determination at step 412 that the values of S and V do not equal set limits, flow proceeds to step 414, whereupon the S value and the V value are tested against a first threshold value and a second threshold value, respectively. When the results of the testing indicate, at step 416, that the S value is less than the first threshold and the V value is greater than the second threshold, flow proceeds to step 418, whereupon the Max-RGB algorithm is applied to the RGB image data. When the S value is not less than the first threshold, or the V value is not greater than the second threshold value, flow proceeds from step 416 to step 420.

At step 420, an output adjustment condition signal is generated and output based upon the values of S and V. That is, when the S value is zero and the V value is one, a negated output condition arises, meaning that no Max-RGB algorithm is to be applied to the image data. When the S value is less than the first threshold and the V value is greater than the second threshold, the output adjustment condition signal is positive, indicating that the Max-RGB algorithm is to be applied to the image data. When the S value is not less than the first threshold, or when the V value is not greater than the second threshold, a "problematic" output adjustment condition signal is generated. It will be appreciated by those skilled in the art that a "problematic" output condition occurs when the application of the Max-RGB algorithm will produce unintended, or undesirable results. The classification of the image in accordance with the subject application thus prevents unnecessary processing by determining, based on the classification, whether or not to apply the algorithm. Following generation of the output adjustment signal at step 420, flow proceeds to step 422, whereupon the enhanced image is output in accordance with a desired document processing operation. It will be appreciated by those skilled in the art that in accordance with one embodiment of the subject application, the output adjustment condition signal is suitably added to the statistical data used in the generation of the thresholds applied above.

According to one implementation of the subject application, values of S and V are determined in accordance with the satisfaction of a general constraint, e.g., $F(S,V)$, where F is representative of a linear or quadratic constraint (equation). Thus, the skilled artisan will appreciate that a result of the constraint is indicative of whether a Max-RGB algorithm should be applied to the received image data or not. A suitable linear constraint includes, for example and without limitation, $a*S+b*V<c$, wherein a, b, and c are constant coefficients for the linear constraint. The skilled artisan will appreciate that other linear or quadratic constraints are also capable of being employed in accordance with the subject application to facilitate in Max-RGB algorithm application to received image data.

Figures 5, 6:
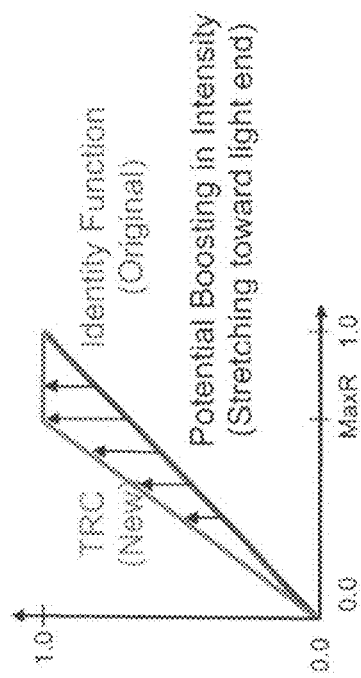
FIG. 5 is a graphical representation of a tone reproduction curve for use in the system and method for image enhancement according to one embodiment of the subject application.
FIG. 6 is an example of a sample spreadsheet application for use in threshold calculations in the system and method for image enhancement according to one embodiment of the subject application.
Figures 7, 8:
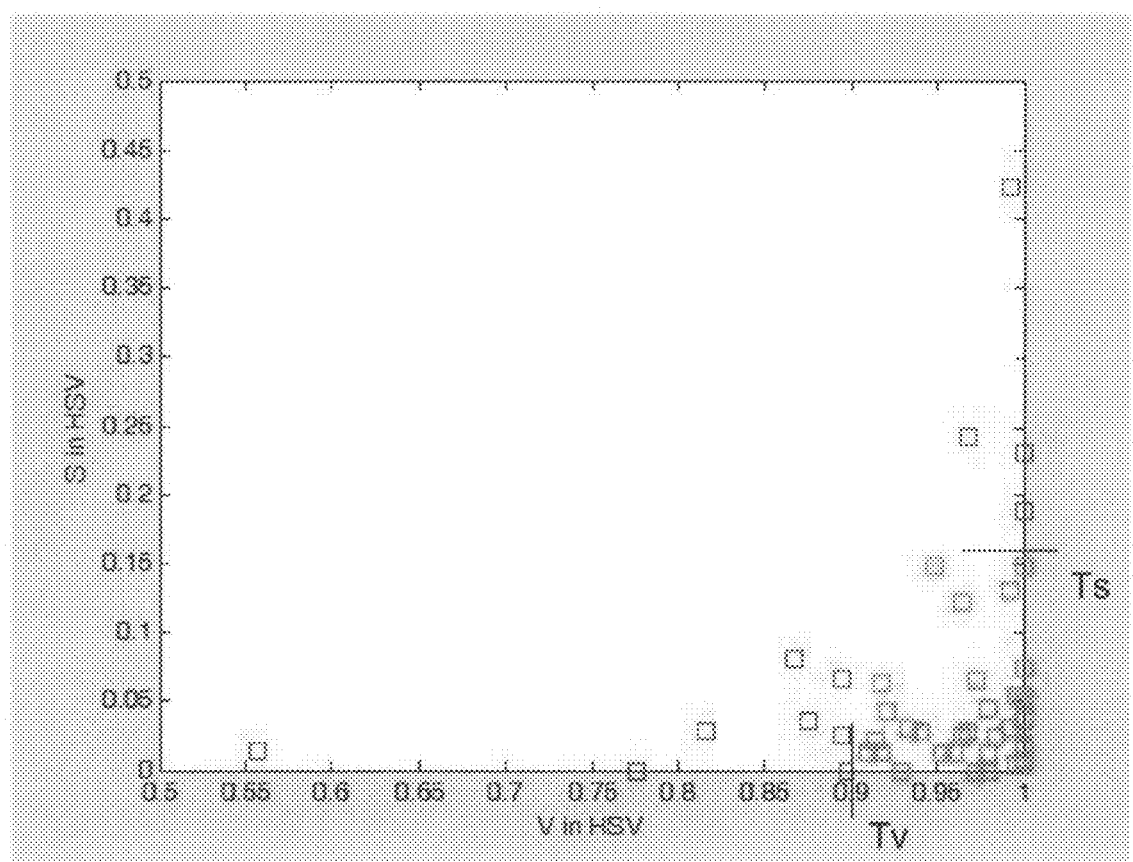
FIG. 7 is an example of a table of statistical analysis illustrating a series of example images and the determination resulting from the use of statistical threshold values in the system and method for image enhancement according to one embodiment of the subject application.
FIG. 8 is an example illustration of case distribution and threshold values of statistical analysis for use in the system and method for image enhancement according to one embodiment of the subject application.

As referenced above, FIG. 5 illustrates a tone reproduction curve, which in accordance with one embodiment of the subject application, is capable of application to all pixels of the input image to improve the hue and brightness of the image. FIG. 6 illustrates a sample spreadsheet application used in accordance with one embodiment of the subject application to facilitate the calculation of suitable thresholds based on statistical data. As shown in FIG. 6, each image is recorded using an image file name, the coordinates of the reference point for each image, the H value, the S value and the V value of the reference point, and a flag, as set by the output condition signal, indicating a 0 for no need to apply the Max-RGB algorithm (negated signal), a 1 to apply the Max-RGB algorithm (positive signal), and a −1 indicating a problematic condition signal. A statistical analysis of the data contained in FIG. 6 is shown in FIG. 7. Turning now to FIG. 7, there is shown a table of statistical analysis illustrating a series of example images and the determination resulting from the use of statistical threshold values. As shown in FIG. 7, the statistical analysis indicates that the majority of example images do not require hue or brightness adjustment, with a very small percentage (4.18%), given the number input, being problematic.

Figure 12:
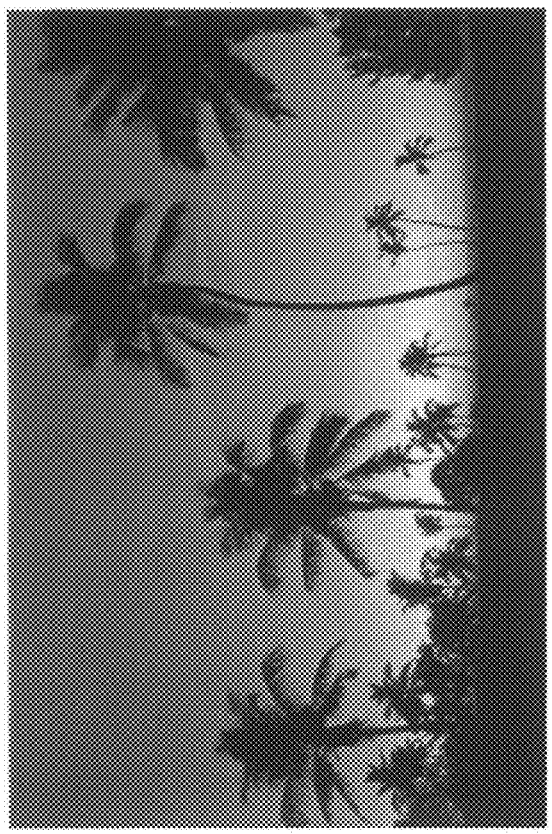
FIG. 12 is an example of an application of the Max-RGB to a problematic image giving rise to undesired results according to the system and method for image enhancement of one embodiment of the subject application.
Figure 11:
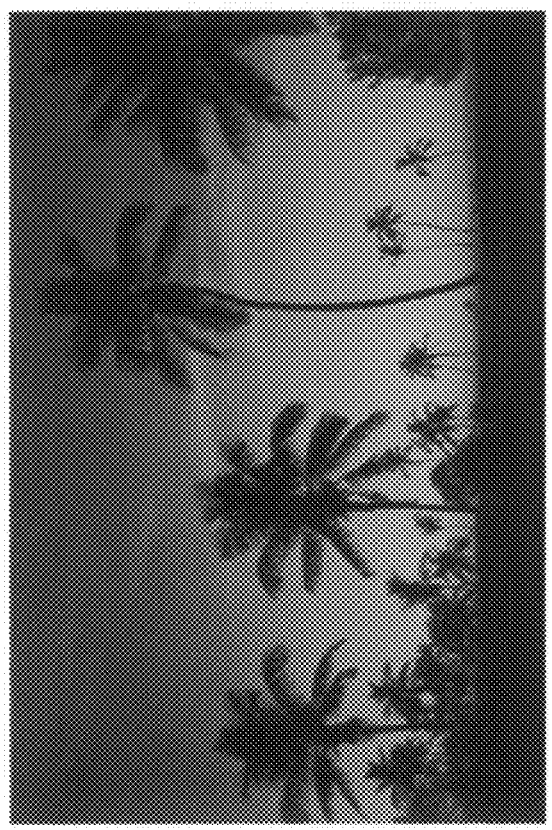
FIG. 11 is an example of an input image received for use in the system and method for image enhancement according to one embodiment of the subject application.

Turning now to FIG. 8, there is shown an example illustration of case distribution and threshold values of statistical analysis. As depicted in FIG. 8, the example images are plotted using the V value of the white point of the sample image versus the S value of the white point of the sample image, with the threshold values $T_V$ and $T_S$ also shown in the map. FIGS. 11 and 12, discussed in greater detail below, illustrate the undesirable outcome of application of the algorithm to an image outside the shaded area.

Figure 10:
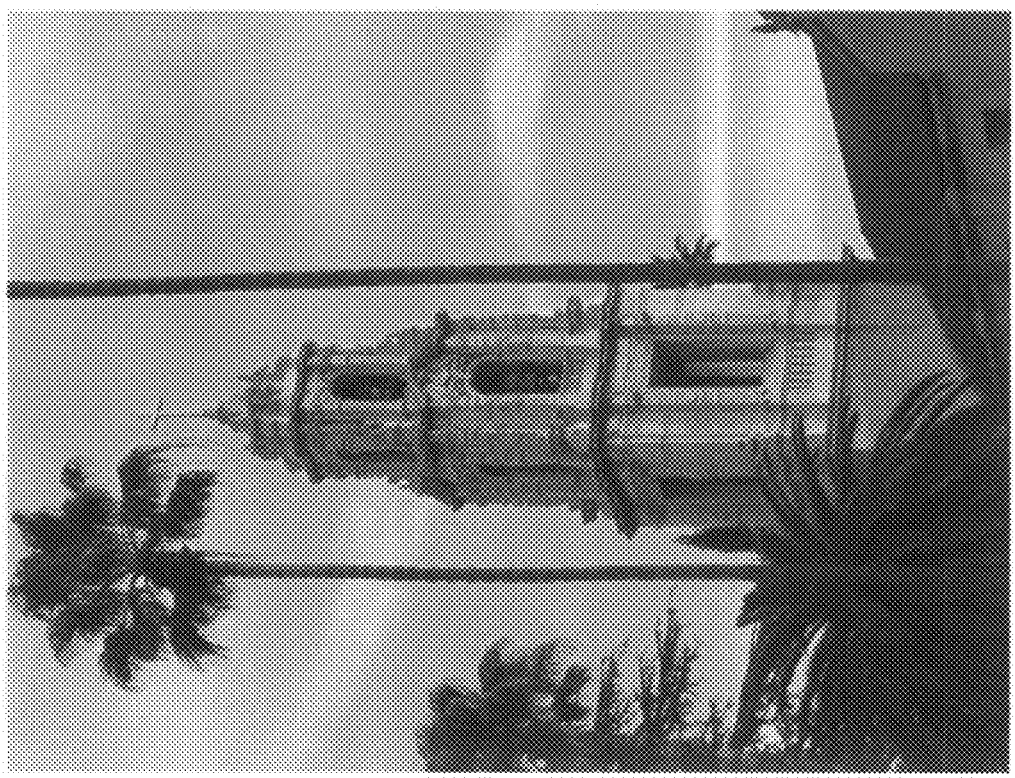
FIG. 10 is an example of an image after application of the Max-RGB algorithm for use in the system and method for image enhancement according to one embodiment of the subject application.
Figure 9:
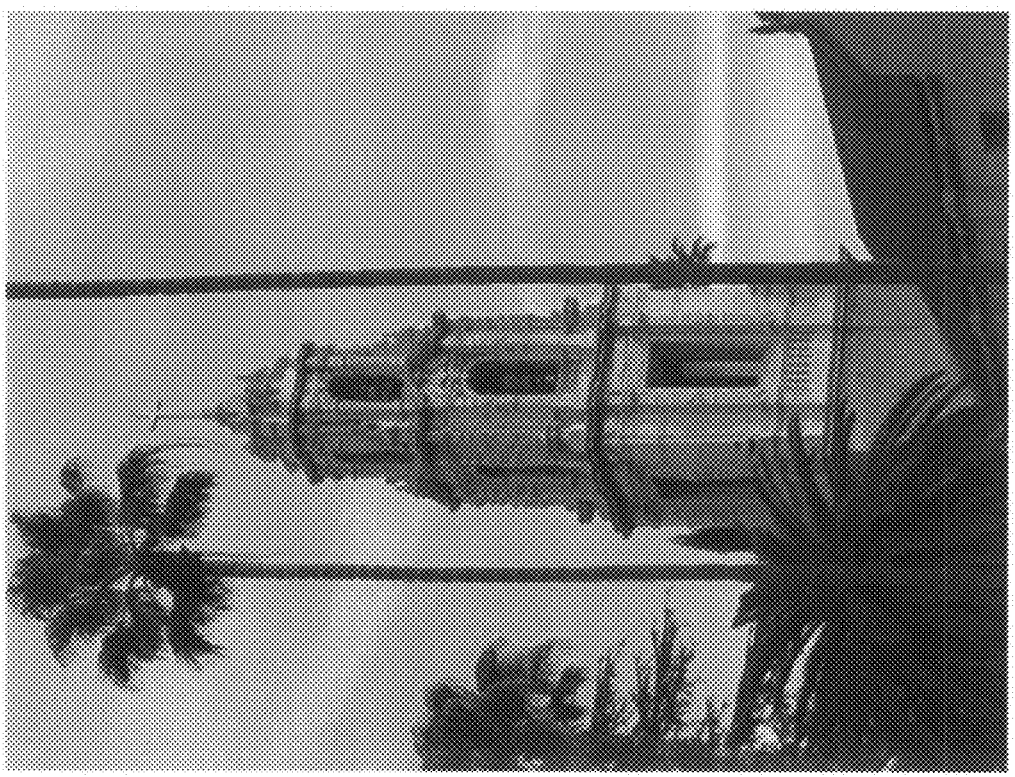
FIG. 9 is an example of an image requiring application of the Max-RGB algorithm for use in the system and method for image enhancement according to one embodiment of the subject application.

FIGS. 9 and 10 illustrate an input image (FIG. 9) and an enhanced output image (FIG. 10) resulting from the application of the subject system and method to the image of FIG. 9. As will be understood by those skilled in the art, the image in FIG. 9 is representative of an image that requires application of the Max-RGB algorithm, resulting in an enhanced image, as shown in FIG. 10. Turning now to FIGS. 11 and 12, there are shown images representing a problematic class of input images received in accordance with one embodiment of the subject application. FIG. 11 illustrates an input image received in accordance with the subject system and method. As shown in FIG. 12, application of the Max-RGB algorithm gives rise to unanticipated and undesired results. Thus, the detection of such an outcome, as indicative of a problematic class of images, saves processing time and avoids an undesired output image.

Figure 14:
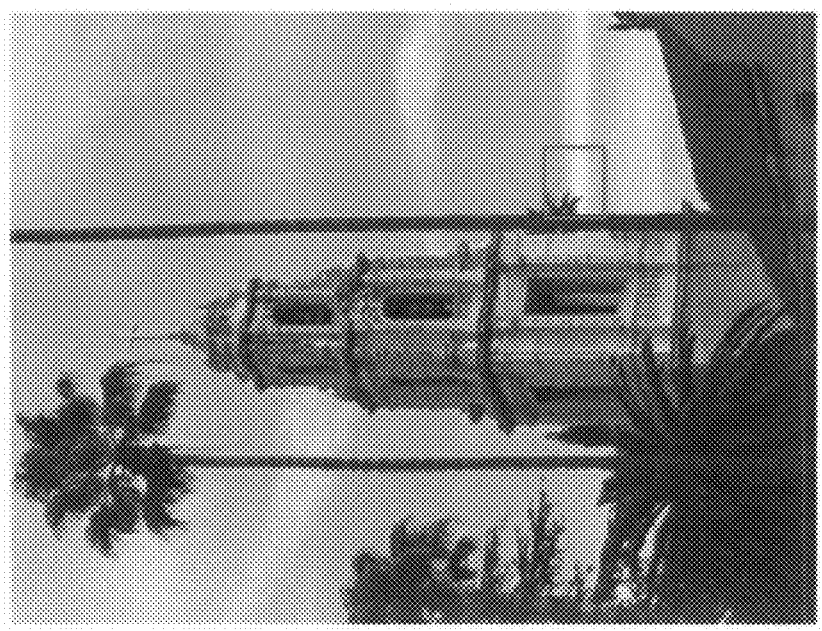
FIG. 14 is an example of an enhanced image following application of the system and method for image enhancement according to one embodiment of the subject application
Figure 13:
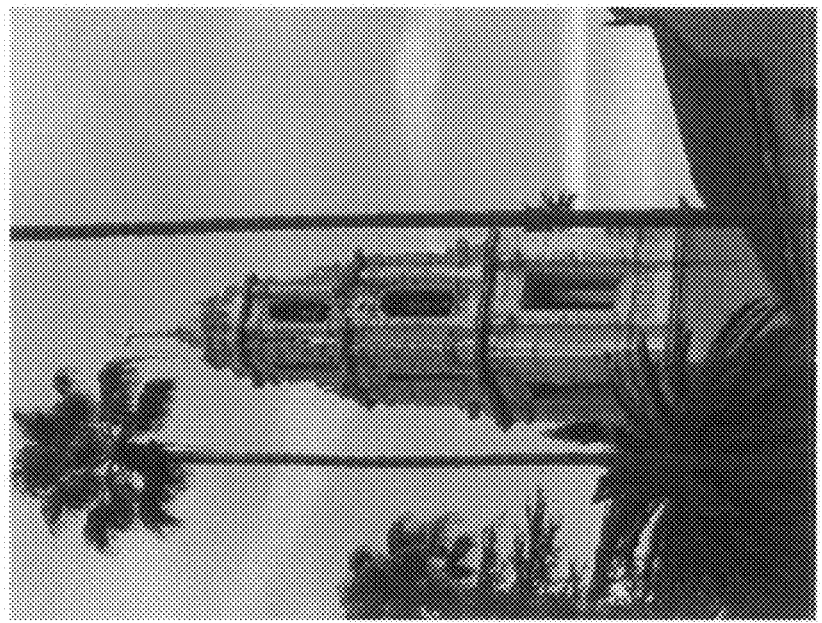
FIG. 13 is an example of an input image received for use in the system and method for image enhancement according to one embodiment of the subject application.

FIGS. 13 and 14 illustrate an original input image, the subject embodiment, and an alternative embodiment. FIG. 13 illustrates an original input image, which is subjected to the methods and systems described above, i.e., a Ymax in the YCbCr color space with a minimum S value in the HSV color space, as illustrated in FIG. 14.

The subject application extends to computer programs in the form of source code, object code, code intermediate sources and partially compiled object code, or in any other form suitable for use in the implementation of the subject application. Computer programs are suitably standalone applications, software components, scripts or plug-ins to other applications. Computer programs embedding the subject application are advantageously embodied on a carrier, being any entity or device capable of carrying the computer program: for example, a storage medium such as ROM or RAM, optical recording media such as CD-ROM or magnetic recording media such as floppy discs; or any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the subject application principles as described, will fall within the scope of the subject application.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed is:

1. An image enhancement system comprising:
   means adapted for receiving YCbCr image data encoded as a plurality of pixels in YCbCr space, wherein Y is a luma component, Cb is a blue chroma component, and Cr is a red chroma component;
   means adapted for selecting a maximum Y value from the image data;
   means adapted for receiving HSV image data corresponding to the YCbCr image data, wherein H is a hue component, S is a saturation component, and V is representative of a brightness component;
   means adapted for selecting a pixel from HSV image data having a minimum S value;
   testing means adapted for testing an S value and a V value of a selected pixel against first and second threshold levels; and
   adjustment means, including a processor and associated memory, adapted for selectively applying a Max-RGB algorithm to RGB image data in accordance with an output of the testing means.

2. The image enhancement system of claim 1 further comprising means adapted for bypassing the adjustment means when at least one of the S value of the selected pixel is zero and the V value of the selected pixel is one.

3. The image enhancement system of claim 1 further comprising means adapted for applying a tone reproduction operation on RGB image data.

4. The image enhancement system of claim 1 wherein the threshold values are statistically based.

5. The image enhancement system of claim 1 further comprising:
   means adapted for receiving RGB image data;
   means adapted for converting received RGB image date into the YCbCr image data; and
   means adapted for converting received RGB image data into the HSV image data.

6. The image enhancement system of claim 1 wherein the testing means includes means adapted for outputting a signal representative of at least one of a positive adjustment, a negated adjustment and a problematic condition relative to adjustment.

7. An image enhancement method comprising the steps of:
   receiving YCbCr image data encoded as a plurality of pixels in YCbCr space, wherein Y is a luma component, Cb is a blue chroma component, and Cr is a red chroma component;
   selecting a maximum Y value from the image data;
   receiving HSV image data corresponding to the YCbCr image data, wherein H is a hue component, S is a saturation component, and V is representative of a brightness component;
   selecting a pixel from HSV image data having a minimum S value;
   testing an S value and an V value of a selected pixel against first and second threshold levels; and
   selectively applying, using a processor and associated memory, a Max-RGB algorithm to RGB image data in accordance with an output of the testing.

8. The image enhancement method of claim 7 further comprising the step of bypassing the step of selectively applying a Max-RGB algorithm when at least one of the S value of the selected pixel is zero and the V value of the selected pixel is one.

9. The image enhancement method of claim 7 further comprising the step of applying a tone reproduction operation on RGB image data.

10. The image enhancement method of claim 7 wherein the threshold values are statistically based.

11. The image enhancement method of claim 7 further comprising the steps of:
    receiving RGB image data;
    converting received RGB image date into the YCbCr image data; and
    converting received RGB image data into the HSV image data.

12. The image enhancement method of claim 7 wherein the step of testing includes outputting a signal representative of at least one of a positive adjustment, a negated adjustment and a problematic condition relative to adjustment.

13. A computer-implemented method for image enhancement method comprising the steps of:
    receiving YCbCr image data encoded as a plurality of pixels in YCbCr space, wherein Y is a luma component, Cb is a blue chroma component, and Cr is a red chroma component;
    selecting a maximum Y value from the image data;

receiving HSV image data corresponding to the YCbCr image data, wherein H is a hue component, S is a saturation component, and V is representative of a brightness component;

selecting a pixel from HSV image data having a minimum S value;

testing an S value and an V value of a selected pixel against first and second threshold levels; and selectively applying a Max-RGB algorithm to RGB image data in accordance with an output of the testing.

14. The computer-implemented method for image enhancement of claim 13 further comprising the step of bypassing the step of selectively applying a Max-RGB algorithm when at least one of the S value of the selected pixel is zero and the V value of the selected pixel is one.

15. The computer-implemented method for image enhancement of claim 13 further comprising the step of applying a tone reproduction operation on RGB image data.

16. The computer-implemented method for image enhancement of claim 13 wherein the threshold values are statistically based.

17. The computer-implemented method for image enhancement of claim 13 further comprising the steps of:
receiving RGB image data;
converting received RGB image date into the YCbCr image data; and
converting received RGB image data into the HSV image data.

18. The computer-implemented method for image enhancement of claim 13 wherein the step of testing includes outputting a signal representative of at least one of a positive adjustment, a negated adjustment and a problematic condition relative to adjustment.

* * * * *